United States Patent [19]
Schoen et al.

[11] Patent Number: 6,049,817
[45] Date of Patent: Apr. 11, 2000

[54] MULTI-PROCESSOR SYSTEM

[75] Inventors: Hans-Ulrich Schoen, Ebenhausen; Bernd Siegwart, Ettringen; Volker Petersen; Christine Matz, both of Munich, all of Germany

[73] Assignee: Siemens Aktiengesellschaft, Munich, Germany

[21] Appl. No.: 08/723,288

[22] Filed: Sep. 30, 1996

Related U.S. Application Data

[63] Continuation of application No. 08/279,107, Jul. 22, 1994, abandoned.

[30] Foreign Application Priority Data

Jul. 23, 1993 [DE] Germany ............... 43 24 852

[51] Int. Cl.⁷ ........................................ G06F 9/52
[52] U.S. Cl. ............................................. 709/102
[58] Field of Search ................ 395/677, 672, 395/706, 200.78, 676; 709/102, 107, 106, 248

[56] References Cited

U.S. PATENT DOCUMENTS

| | | | |
|---|---|---|---|
| 4,316,245 | 2/1982 | Luu ........................... | 364/200 |
| 4,757,442 | 7/1988 | Sakata ....................... | 364/200 |
| 4,937,741 | 6/1990 | Harper ....................... | 364/200 |
| 5,058,037 | 10/1991 | Kageyama et al. ....... | 364/519 |
| 5,193,186 | 3/1993 | Tamaki et al. ............ | 395/650 |
| 5,251,308 | 10/1993 | Steven ....................... | 395/425 |
| 5,293,620 | 3/1994 | Barabash et al. .......... | 395/650 |
| 5,404,550 | 4/1995 | Horst ......................... | 395/800 |
| 5,430,850 | 7/1995 | Papadopoulos ............ | 395/375 |
| 5,437,032 | 7/1995 | Wolf .......................... | 395/650 |
| 5,442,797 | 8/1995 | Casavant ................... | 395/800 |
| 5,452,461 | 9/1995 | Umekita .................... | 395/700 |
| 5,781,752 | 7/1998 | Moshovos et al. ........ | 395/392 |

FOREIGN PATENT DOCUMENTS

| | | |
|---|---|---|
| 0 223 463 | 5/1987 | European Pat. Off. . |
| 0 330 836 | 9/1989 | European Pat. Off. . |
| 0 547 991A2 | 6/1993 | European Pat. Off. . |

OTHER PUBLICATIONS

Efficient Synchronization Primitives for Large–Scale Cache–Coherent Multiprocessors by James R. Goodman et al, Computer Architecture News 17, Apr. 1989, No. 2, New York pp. 64–75.

"The AMCAD Real–Time Multiprocessor Operating System", by Michael S. Rottman et al. IEEE 1989 National Aerospace and Electronics Conference NAECOM 1989, pp. 1813–1818.

"Poolpo–A–Pool of Processors for Process Control Applications" by Hubert D. Kirrmann et al., IEEE Transactions on Computers, vol. C–33, No. 10, Oct. 1984, pp. 869–878.

"Mapped Static Allocation for Parallel Subprograms" IBM Technical Disclosure Bulletin, vol. 32, No. 6B, Nov. 1989, pp. 241–245.

"Barrier Synchronization Using Fetch–and–Add and Broadcast", IBM Technical Disclosure Bulletin, vol. 34, No. 8, Jan. 1992.

"Controlling System for Task Control Table"., by Seisakusho, Patent Abstracts of Japan, p. 1, Publication date Sep. 4, 1983.

*Primary Examiner*—Majid A. Banankhah
*Assistant Examiner*—Sue Lao
*Attorney, Agent, or Firm*—Hill & Simpson

[57] ABSTRACT

A multiprocessor system is disclosed wherein optimum utilization of all active processors is achieved for processing of static task packets. Active processors in a multiprocessor system independently fetch tasks from a central task control table of common memory for processing. The processors wait at a synchronization point until the conditions determined by the synchronization point have been satisfied.

11 Claims, 1 Drawing Sheet

TCT

| TASK | TYP | SynM oder | | |
|---|---|---|---|---|
| | | NI | MI | IR |
| TCTI | R | | | |
| CP11 | R | | | |
| CP12 | R | | | |
| CP13 | R | | | |
| ......... | ... | | | |
| SynP1 | WFE | ( : CP11 , CP12 : ) | | |
| CP21 | R | | | |
| CP22 | R | | | |
| CP23 | R | 1025 | 1024 | 32 |
| CP24 | P | 127 | 576 | 18 |
| SynP2 | WFE | ( : CP13 , CP21 : ) | | |
| CP31 | S | 1 | 4032 | 126 |
| CP32 | P | | | |
| ......... | ........ | | | |
| SynP3 | WFE | ( : CP23 , ...... : ) | | |
| ......... | ........ | | | |
| ......... | ........ | | | |
| FIN | WFE | ( : all CPxy : ) | | |

FIG 1

TCT

| TASK | TYP | SynM oder | | |
|---|---|---|---|---|
| | | NI | MI | IR |
| TCTI<br>CP11<br>CP12<br>CP13<br>........ | R<br>R<br>R<br>R<br>... | | | |
| SynP1 | WFE | ( : CP11 , CP12 : ) | | |
| CP21<br>CP22<br>CP23<br>CP24 | R<br>R<br>R<br>P | 1025<br>127 | 1024<br>576 | 32<br>18 |
| SynP2 | WFE | ( : CP13 , CP21 : ) | | |
| CP31<br>CP32<br>......... | S<br>P<br>......... | 1 | 4032 | 126 |
| SynP3 | WFE | ( : CP23 , ...... : ) | | |
| ..........<br>............ | ........<br>........ | | | |
| FIN | WFE | ( : all CPxy : ) | | |

| MP | RT | BI |
|---|---|---|
| MPM | CP21 | 0 |
| MP1 | FIN | 0 |
| MP2 | CP24 | 91 |
| MP3 | CP24 | 109 |
| | | |
| MPn | FIN | 0 | ns
MULTI-PROCESSOR SYSTEM

This is a continuation of application Ser. No. 08/279,107, filed Jul. 22, 1994, now abandoned.

BACKGROUND OF THE INVENTION

1. Field of the Invention

The present invention relates to multi-processor computing systems and more particularly this invention relates to multi-processor computing systems which employ synchronization points to efficiently distribute tasks among independent processors.

2. Background and Summary of the Invention

In the present invention, a switching system operates in conjunction with a multi-processor system so that a task packet may be executed as quickly as possible. Some tasks of the task packet are dependent on one another, i.e. a sequential task is based on the result of a previously processed task in contrast, other tasks, are completely independent of one another. An example of this is found in the initialization of transient switching-oriented data after a system recovery (restart) of a switching system. In such a situation, transient, port-related data must be updated or, respectively, initialized first on the basis of current system data before clear bands for trunks can be set up. Other restart tasks such as initialization of traffic measurement tables can be executed completely independently of other tasks.

The size and runtime of the individual tasks is known for some tasks, however, the runtime of other tasks is highly dependent upon the current system configuration which is often difficult to predict if it can be predicted at all. Factors which affect runtime include the size of the overall system and the momentary system condition of field components.

In a multi-processor system having a common data memory region (common memory), optimum utilization of all available processors for the fastest possible execution of a task packet is desired. In order to accomplish this result, the execution of individual tasks which are dependent on one another is coordinated such that no processor of the multi-processor system is unnecessarily in a wait state. The present invention employs scheduling at synchronization points which is independently executed by the processors. In this system, only a master processor which executes a chronological monitoring at a synchronization point has a special priority, each remaining processor has the same priority. This configuration allows especially large individual tasks to be subdivided into sub-tasks which can be executed in parallel fashion by a number of processors. Thus, optimum division and utilization of the available processor capacity can be achieved during processing depending on the size of a parallel procedure which is divided into sub-tasks. Even in the worst case, this design also assures minimum delay in the processing of a task packet when a processor fails during execution of an individual task.

The invention is set forth in greater detail below with reference to the exemplary embodiments and the drawings.

BRIEF DESCRIPTION OF THE DRAWINGS

FIG. 1 illustrates the structure of a task control or dispatcher table;

FIG. 2 illustrates a processor table of the present invention.

DETAILED DESCRIPTION OF THE PREFERRED EMBODIMENTS

It is assumed in the example of the preferred embodiment that the task packet is a packet for the initialization of a multi-processor system upon a restart. In order to enable the parallel initialization of a multi-processor system, the entire task packet is subdivided into individual tasks for initialization, these are statistically listed in a task control or dispatcher table. Individual tasks that are independent of one another are combined in blocks that can be processed in parallel; tasks which are dependent on one another are separated by synchronization points. A task status entry is also made for each individual task indicating whether it has already been executed, is underway or yet to be processed.

The processing of all individual tasks ensues in a parallel fashion on individual processors. Individual tasks are not assigned to the individual processors according to a fixed protocol, rather, each active processor independently fetches the next free individual task from the task control or dispatcher table for processing. At the same time, the task status is marked as being "underway" in the task control or dispatcher table and is subsequently marked as "executed" after the task is completed.

FIG. 1 illustrates the structure of an inventive task control table TCT as well as its contents at a specific point in time during processing of a task packet. The task control table contains a first column TASK in which individual tasks Cpxy, i.e. procedures for processing the individual tasks are listed. The principle for implementation of the processing is extremely simple. Each processor looks at the task control table, takes the next free procedure from this table, executes this task and proceeds to the next available task.

There are two types of tasks, namely those that can sequence independently in parallel and those which are dependent on one another and cannot be processed in parallel. One example of dependent procedures is one where the procedures access the same data or two procedures wherein one procedure must be completed before the other can be initiated.

The task control table contains what are referred to as synchronization points SynP. In order to assure the correct calling sequence of the procedures CPxy due to the presence of dependent procedures, each synchronization point is represented by a parameter list, which is referred to below as synchronization mask SynM. The synchronization mask is a data structure that contains the names of those procedures that must be completed at this synchronization point. As soon as a processor reaches a synchronization point, it waits until all procedures listed in the synchronization mask have been executed. All procedures within a block between two synchronization points can thus be executed parallel.

The runtime of the different procedures must be taken into account in the design of the task control table. Because procedures of the task control table are taken from top to bottom sequentially, care must be exercised to verify that procedures having a longer runtime are placed at the start of a block, particularly when they are contained in the subsequent synchronization mask. This avoids unnecessary delay at a synchronization point.

The task control table TCT is not only statically but also dynamically initialized. For implementation of the dynamic initialization, the task control table contains a table initialization procedure TCTI that represents the first individual task of the task package to be processed in the task control table. The individual tasks are each successively taken from the task control table beginning at the top with the table initialization procedure TCTI, and whereby the individual tasks are executed by different processors. Searching for an individual task that is still free is realized by a loop over all individual tasks. To that end, a loop variable is declared as a local data structure in every processor. No corresponding data structure in the common memory is employed in order to obtain information about the next free individual task. The reason for this is that, unlike a common loop variable, no specific mechanism is required according to this method in order to protect the loop variable against parallel access. A minor disadvantage of this method is that every processor may, under certain circumstances, repeatedly encounter an individual job during the search that has already been processed by a different processor before it receives the next free individual task. This, however, results in only a negligible loss of performance.

Each individual task is defined in greater detail by a variable which is located in a second column of the task control table with the name "TYP". Procedures of the type S are serially processed, i.e. by a single processor. They have a comparatively short runtime. The entry S in the type column of the task control table simultaneously indicates that this procedure is still not processed. As soon as this a procedure is fetched by a processor, the entry S is simultaneously replaced by the entry R. Subsequent processors are thereby informed that this procedure "is underway or, respectively, handled" and each remaining processor subsequently skips this procedure.

Procedures (individual tasks) of type P are tasks which have a long runtime. For this reason, they can be repeatedly fetched with different parameter values and can thus be executed in a parallel fashion on various processors. Below, procedures of the type P are referred to as parallel procedures. Each parallel procedure contains a loop over a plurality of regions of data elements that are initialized piece-by-piece. A parallel procedure is fetched with a current start index NI and with an end index as interface parameters. The values of the indices can be taken from the task control table as P-type procedures contain a column for the start index NI, a further column for a maximum index MI and another column for an index region IR (region parameter).

The absolute number of data elements initialized with the parallel procedure is respectively stored under the maximum index MI. The index region IR defines the relative number of data elements that are initialized individually, i.e. by a single processor. The maximum index MI and the index region IR are identified by a table initialization procedure TCTI during the dynamic initialization of the task control table. The table initialization procedure thereby receives the maximum index either by importing the corresponding system variable or by calling in a corresponding sub-procedure. The index region IR is calculated by the table initialization procedure on the basis of the following equation:

$$IR=MI/(8*No).$$

whereby No indicates the number of all active processors. The afore-mentioned equation results from the fact that the number of calls of a parallel procedure must be matched as well as possible to the number of active processors. This equation is therefore selected such that the number of calls is eight times greater than the number of active processors. This guarantees that all active processors are busy with the execution of a sub-task of the parallel procedure and thus avoiding unnecessary idle times. The number of all active processors in FIG. 1 is equal to 4, thus a maximum index of, for example, 1024 yields a region parameter (index region) of 32.

The start index NI determines the beginning of the data region which is to be processed in the next call of the parallel procedure. The end index is calculated by summation of the value for the start index and the index region. The start index always has the initialization value ("1") after the static initialization of the task control table.

Every time a processor fetches information for call of a parallel procedure from the task control table, the start index is incremented by the value of the index region IR, this is the new start index for the next calling processor. At the last call of the parallel procedure, the value of the end index finally has the value "(maximum index+1)". After the last call, all sub-tasks of this parallel procedure have thus been executed by the processors and the momentary entry P for each parallel procedure is modified into an entry R with which indicates that a procedure is underway or, respectively, handled. This marking informs the active processors that look into the task control table that they should skip, i.e. not call this parallel procedure in their loop traversal. An individual task of type WFE represents a synchronization point SynP. The parameters for this procedure are stored in the task control table in a column having the name SynM. An element of this column represents a data structure that contains a list of all procedures that must be completed before the next procedure can be called. This data structure is referred to as synchronization mask SynM.

Every processor that reaches a synchronization point determines whether all procedures listed in the synchronization mask have already been executed. It takes this information from what is referred to as a processor table that lies in the common memory of the system. The processor table is described in greater detail below.

A processor that has reached a synchronization point also checks to see whether another processor has gone down during the execution of one of the procedures contained in the synchronization mask. The interrupt procedure is then again completely implemented by the checking processor. The execution which is performed as a result of such an outage is also discussed in greater detail below.

When no processor is down and at least one additional processor is executing a procedure that is listed in the synchronization mask, a processor that arrives at a synchronization point must wait until all procedures are completed. The processor that has completed the last procedure of the synchronization mask modifies the entry WFE into the entry GON and sends a continuation message to all active processors, this indicates that they should end their waiting condition and continue initialization of the multi-processor system.

It must be assured in the processing of a task packet that each task procedure is in fact executed, even when a processor fails during the execution of a task procedure. In order to assure other processors to identify this event, each processor must write the name of the procedure that it is currently processing in a data field of the processor table which is allocated in the common memory.

FIG. 2 shows a processor table PT that handles processor failures and contains information fields RT and BI for each and every processor MP. Before a processor executes a procedure, it enters the name of this procedure into the information field RT of its data structure line in the processor table. When a processor fetches a sub-task of a parallel procedure, the start index is also entered into the information field BI of the processor table in addition to the name of the parallel procedure. This is accomplished with a non-interruptible command simultaneously with the execution of the start index NI in the task control table. The fetching of an individual or, respectively, sub-task and the entry into the processor table thus occur simultaneously. Consequently, other processors cannot access during this event.

As soon as the current task of a processor has been completed, the entries in its information fields are overwritten by initialization values "FIN" and "0". As previously mentioned, every processor that reaches a synchronization point must determine whether all procedures that are listed in the corresponding synchronization mask are already executed. In order to receive this information it checks the entries in the processor table.

As also previously mentioned, each processor must also check at a synchronization point whether another processor has failed during the execution of a procedure of the synchronization mask. In order to accomplish this check, the failure of a processor is stored in the reliability database of the system which is accessible by all processors. When a processor determines during this check that a procedure in the synchronization mask has not yet been completed and the processor which is designated in the processor table for execution of this task has failed, then the checking processor re-executes this task instead of the failed processor. It transfers the information from the information fields of the malfunctioning processor into its own information fields in the processor table and subsequently enters the initialization values into the information fields of the failed processor. When the task that must be repeated is a sub-task of a parallel procedure, the information about the start index of this sub-task must likewise be taken form the information field of the malfunctioning processor. The end index is calculated in the checking processor looks into the task control table and adds the region index relating thereto.

An infinite wait state of a processor which has arrived at a synchronization point may be caused by an infinite loop in an initialization procedure or by a failure of a processor that should send a continuation message. In order to avoid an infinite waiting in such a case, processor waiting is monitored by a timer. This monitoring is exclusively executed by a specific processor, which is referred to as a master processor MPM. A master processor that has arrived at a synchronization point sets a timer before it switches into a waiting condition for the continuation message. When the timer has run down, the master processor repeats the check of the processor table. If a procedure is still marked as "underway" therein and no processor has failed, the master processor resets the timer. When the master processor receives no continuation message during this time span, the setting of the timer is repeated until the longest possible runtime of an initialization procedure has elapsed. When this time span has elapsed without the master processor having received a continuation message, the master processor generates an error message. In response thereto, the master processor removes the still unexecuted procedure from the processor table, without repeating this task as it may contain an infinite loop. Moreover, the value GON is entered under the column TIP in the task control table at the synchronization point and the continuation message is sent to the other processors MP1 . . . , Mpn. The processing of the task packet then continues.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim:

1. A system for simultaneously processing a plurality of tasks comprising:

a plurality of processors for simultaneously processing said tasks;

a common memory containing a task control table, said task control table having a plurality of task entries accessible to said processors for fetching corresponding tasks indicated in the task entries and processing the tasks, each of the task entries having information about a type of task and whether the task has already been fetched by a processor; and a synchronization point in the task control table having a parameter list of at least one selected task entry which must be completed before any of the processors access a task entry subsequent to the synchronization point, and information whether the parameter list has been completed;

wherein the task entries subsequent to the synchronization point are accessible to the processors whether or not task entries prior to the synchronization point which are absent from the parameter list have been completed.

2. The system for simultaneously processing a plurality of tasks of claim 1, wherein the processor which completes a last task preceding the synchronization point sends a continuation message to any processors waiting at the synchronization point.

3. The system for simultaneously processing a plurality of tasks of claim 2, further comprising a means for controlling said processing for causing each of the processors to wait until selected tasks of the group of task entries which precede the synchronization point are complete wherein said means for controlling includes a means for monitoring the processing of said tasks by determining the length of a wait of any processor at a synchronization point waiting for said continuation message.

4. The system for simultaneously processing a plurality of tasks of claim 3, wherein said means for monitoring includes means for sending an error message when the duration of the wait state exceeds a predetermined interval.

5. The system for simultaneously processing a plurality of tasks of claim 4, wherein said means for sending also sends a continuation message to the remaining processors.

6. The system for simultaneously processing a plurality of tasks of claim 1, further comprising means for a dynamically initializing the task control table by calculating a region parameter based on the size of a parallel procedure and the number of available processors.

7. A method for processing a task packet with a plurality of processors comprising the steps of:

processing a first group of tasks preceding a synchronization point in the order in which the tasks are listed in a task control table with a number of different processors;

identifying at least one task of the first group of tasks by a synchronization point parameter list which must be completed before any of the processors access a task subsequent to the synchronization point;

verifying that all tasks of the synchronization point parameter list have been completed before processing an additional task with a processor that has reached the synchronization point; and processing a second group of tasks after the synchronization point with the number of different processors whether or not a task of the first group of tasks preceding the synchronization point which is absent from the synchronization point parameter list has been completed.

8. The method for processing a task packet with a plurality of processors of claim 7, comprising the additional step of: determining whether a processor has failed during execution of a particular task with a checking processor; and executing the particular task with the checking processor if the processor has failed.

9. A method or processing a plurality of tasks with a plurality of processors comprising the steps of:

generating a task control table;

processing a plurality of said tasks from said task control table with a plurality of processors;

while processing at least one of said tasks with a corresponding processor, repeating a step of assigning a next task from the task control table to a next available processor and processing said task with said processor;

for each task completed by a processor, updating the task control table to reflect completion of the task;

accessing a parameter list of a synchronization point in the task control table with one of the processors;

identifying at least one task by the parameter list which must be completed before any of the processors access a task entry subsequent to the synchronization point;

preventing the processors from accessing all tasks subsequent to the synchronization point until all of the tasks identified in the parameter list have been completed; and allowing task entries subsequent to the synchronization point to be accessed by at least one of the processors whether or not task entries prior to the synchronization point which are absent from the parameter list have been completed.

10. The system for simultaneously processing a plurality of tasks of claim 1, wherein the type of task comprises:

a serial task serially processed on one processor of the plurality of processors; and a parallel task processed in parallel on more than one processor of the plurality of processors.

11. The system for simultaneously processing a plurality of tasks of claim 1, wherein the task entries are accessed sequentially from a top of the task control table, and each processor accesses a next free task entry from the task control table without prior assignment of any specific task entry to a specific processor.

* * * * *